United States Patent [19]

Calcagno et al.

[11] 4,009,468
[45] Feb. 22, 1977

[54] LOGIC NETWORK FOR PROGRAMMABLE DATA CONCENTRATOR

[75] Inventors: Piero Calcagno; Enzo Garetti; Günter Lobisch, all of Turin, Italy

[73] Assignee: CSELT - Centro Studi e Laboratori Telecomunicazioni SpA, Turin, Italy

[22] Filed: Apr. 4, 1975

[21] Appl. No.: 565,114

[30] Foreign Application Priority Data

Apr. 5, 1974 Italy .................................. 68089/74

[52] U.S. Cl. .................... 340/147 C; 179/18 FC; 307/243; 340/147 LP
[51] Int. Cl.² ...................... H04Q 3/00; H04J 3/00
[58] Field of Search .... 340/147 C, 147 CN, 147 R, 340/147 T, 166 R, 163, 147 LP; 179/18 FC, 18 GF; 307/243, 209, 208

[56] References Cited

UNITED STATES PATENTS

| | | | |
|---|---|---|---|
| 3,311,705 | 3/1967 | Le Corre et al. | 179/18 FC |
| 3,400,224 | 9/1968 | Heitmann | 179/18 GF |
| 3,573,388 | 4/1971 | Dagnall, Jr. | 179/18 GF |
| 3,657,470 | 4/1972 | Sarati et al. | 340/163 X |
| 3,700,819 | 10/1972 | Marcus | 179/18 GF |
| 3,819,869 | 6/1974 | Lamartina et al. | 179/18 FC |
| 3,885,167 | 5/1975 | Berglund | 307/243 X |

*Primary Examiner*—Donald J. Yusko
*Attorney, Agent, or Firm*—Karl F. Ross; Herbert Dubno

[57] ABSTRACT

For the selective energization of combinations of up to $m$ data outputs of a data concentrator with $n$ data inputs ($n > m$), the concentrator is provided with $n$ control inputs energizable in various patterns. The concentrator comprises a logic network with an enabling section and a performing section, each in the form of a truncated orthogonal matrix with $m$ rows and $n$ columns of gating circuits. In each matrix the number of gating circuits decreases from $n$ in the first row to $(n-m+1)$ in the last row. The gating circuits of each column of the enabling matrix are connected in parallel to a respective control input whose energization gives rise to an internal activation signal in one of these circuits and simultaneously blocks the circuits of the same row while unblocking those on a diagonal for possible activation by the energization of one of the following control inputs; thus, only one activation signal can come from any row and the number of such activation signals — up to $m$ — depends on the number of energized control inputs. The gating circuits of the performing section consist each of a coincidence (NAND or AND) gate connected on the one hand to an output terminal of the corresponding circuit of the enabling matrix and on the other hand to a data input, the gates of each column being connected to the same data input in parallel; the gates of each row work into a common summing circuit (NAND or OR gate) energizing a respective data output if an activation signal is applied to a gating circuit of that row connected to an energized data input.

10 Claims, 5 Drawing Figures

LOGIC NETWORK FOR PROGRAMMABLE DATA CONCENTRATOR

FIELD OF THE INVENTION

Our present invention relates to a logic network for a data concentrator included in a digital data-processing system.

BACKGROUND OF THE INVENTION

In the more recent systems of this description, a data processor may receive inputs simultaneously from a large number of sources but may require data from only a limited number of these sources in any particular operating phase. Such a situation exists, for example, in the arithmetical units of digital computers performing sequential mathematical operations.

If only one data input per phase is to be utilized, a multiplexer inserted between these sources and a utilization circuit will suffice. If the number of active data inputs per phase is greater but their selection is dictated by a relatively simple program, a conventional priority encoder may be employed for this purpose. In more sophisticated systems, however, no satisfactory solution has been found up to now as far as we are aware. Thus, if an associated control circuit is pre-programmed for each individual phase, the system is not readily adaptable to changes in the program. If, on the other hand, the controller is adjustable to all possible input combinations on instructions from the programmer, its circuitry will have to be highly complex in accordance with prior-art techniques.

OBJECTS OF THE INVENTION

The general object of our present invention, therefore, is to provide a simplified data concentrator which can be instantly programmed to select, from a multiplicity of $n$ data inputs, different combinations of up to $m$ inputs (with $m$ smaller than $n$) for transmitting their binary signals to a like number of data outputs.

A more particular object is to provide a data concentrator of this description which can be built up from a limited variety of basic modular units whose addition or removal permits the number $n$ of data inputs and the number $m$ of data outputs to be changed at will.

SUMMARY OF THE INVENTION

A data concentrator according to our invention comprises a logic network equipped with $n$ controls inputs in addition to the aforementioned $n$ data inputs and $m$ data outputs, this network being divided into an enabling section provided with the control inputs and a performing section provided with the data inputs and outputs. Each of the two sections includes a multiplicity of primary and secondary gating circuits, respectively, specifically $m(n-m-1/2)$ gating circuits per section, each secondary gating circuit being individually associated with a respective primary gating circuit for receiving therefrom an activating signal upon the energization of a corresponding control input. The primary gating circuits are interconnected in $m$ preference chains permitting the emission of not more than one activating signal per chain; the secondary gating circuits associated with the primary gating circuits of a preference chain are provided with a common summing circuit connecting them to a respective data output. These secondary gating circuits are further connected to the data inputs so as to pass a binary signal (such as a logical "1") from a data input to a data output only in the presence of an activation signal due to the energization of a corresponding control input.

In the preferred embodiment described hereinafter, the gating circuits of each section form a truncated orthogonal matrix with $n$ columns and $m$ rows, the rows of the enabling matrix constituting the preference chains while the rows of the performing matrix are provided with the summing circuits referred to. In each matrix the number of gating circuits per row decreases progressively from $n$ in the first row to $(n-m+1)$ in the last row while the number of gating circuits per column increases progressively from 1 in the first column to $m$ in the $m^{th}$ column and remains at this value $m$ in all subsequent columns. The primary gating circuits in any column of the enabling matrix are connected in parallel to a respective control unit whereas the secondary gating circuits of any column in the performing matrix are connected in parallel to a respective data input.

In the enabling matrix, only the gating circuits of the first row are directly activable upon energization of their respective control inputs and each except the last gating circuit of any but the last row has a noninverting connection to the immediately following gating circuit of the next row, diagonally adjoining it, for making same activable, i.e. switchable, upon emitting its own activation signal. Conversely, each except the last gating circuit of any row has an inverting connection to all following gating circuits of the same row for blocking same, i.e. making it unswitchable, upon emitting its activation signal.

In the performing matrix, each gating circuit comprises a coincidence gate connected on the one hand to the respective data input and on the other hand to the associated primary gating circuit for receiving the activation signal thereof. Since the Boolean equivalent of the sum of several terms is the inverted product of their negations, the summing circuit may comprise an OR gate if the coincidence gates are AND gates or, alternatively, a NAND gate if the coincidence gates are also NAND gates.

BRIEF DESCRIPTION OF THE DRAWING

The above and other features of our invention will now be described in detail with reference to the accompanying drawing in which.

SPECIFIC DESCRIPTION

Figure 1:
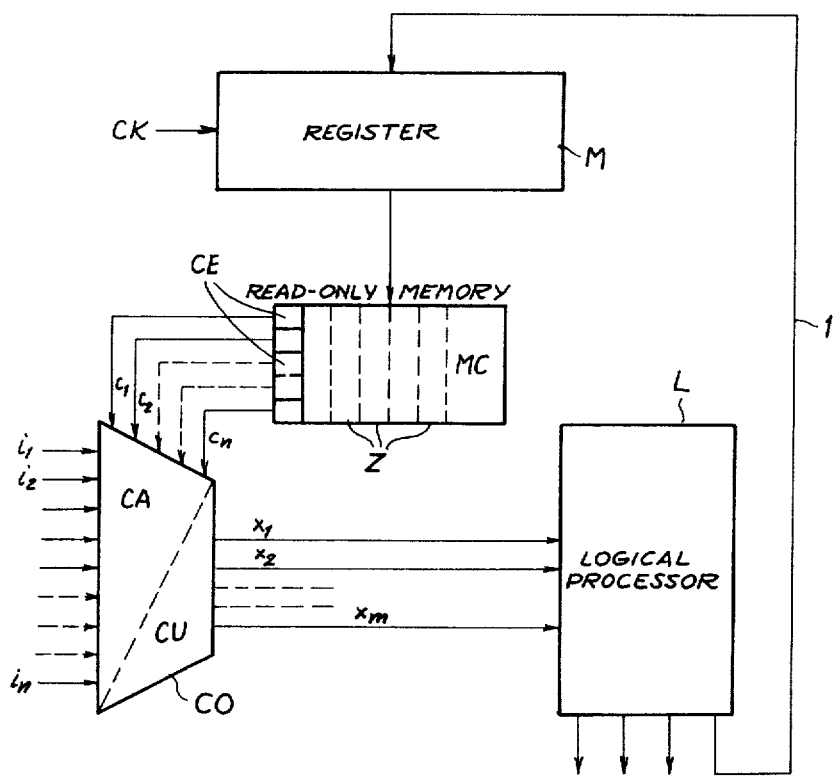
FIG. 1 is a block diagram of a data-processing system including a programmable data concentrator according to our invention.

In FIG. 1 we have shown a data-processing system including a logical processor L to which data are fed from a multiplicity of sources (not shown) by way of respective data inputs $i_1, i_2, \ldots i_n$ terminating at a concentrator CO. The number $m$ of data outputs $x_1, x_2, \ldots x_n$, connected to processor L, is smaller than the number $n$ of data inputs. At the beginning of each operating phase, processor L sends instructions over a line 1 to a register M addressing a read-only memory MC with a number of stages Z each subdivided into $n$ cells CE. Register M, stepped by synchronizing pulses CK from a nonillustrated clock circuit also working into processor L, is connected to memory MC via a multiple 2 for reading out the binary contents of the cells CE of any stage Z of that memory, selected by the processor, into corresponding control inputs $c_1, c_2, \ldots c_n$ of concentrator CO which are individually related to data inputs $i_1 - i_n$. Concentrator CO comprises an enabling section CA and a performing section CU which will be described in greater detail hereinafter.

The selective energization of up to $m$ control inputs $c_1 - c_n$ results in the transfer of binary signals from as many data inputs $i_1 - i_n$ to a corresponding number of data outputs $x_1 - x_m$. In any operating phase, therefore, not more than $m$ data inputs will be active, i.e. will cause energization of a data output if their own state of energization is a logical "1".

Figure 2:
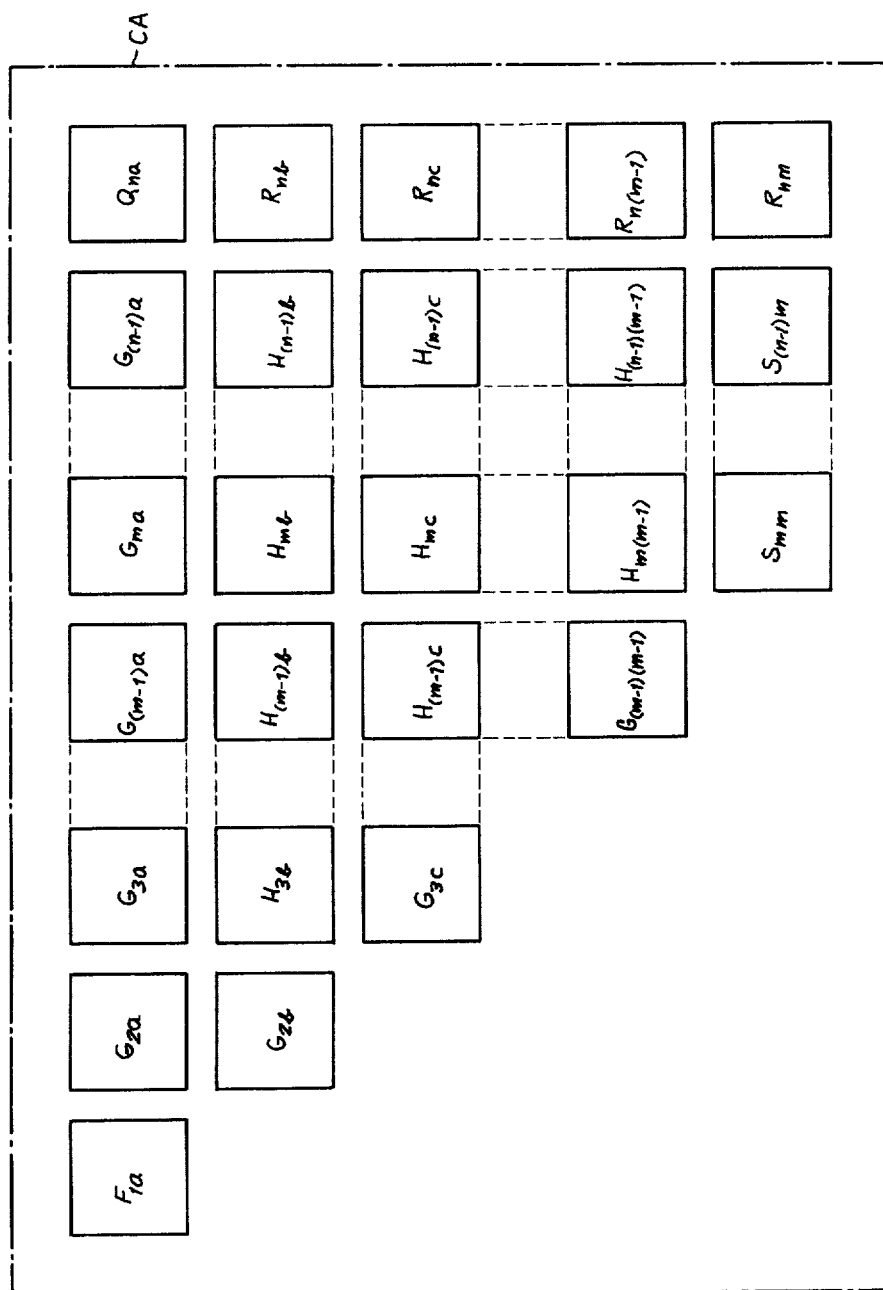
FIG. 2 is a block diagram of an enabling matrix forming part of the concentrator of FIG. 1.

FIG. 2 shows enabling section CA as a truncated orthogonal matrix of primary gating circuits constituted by basically identical modular units which, however, differ in certain respects according to their position in the matrix. The latter has the shape of a right trapezoid with $n$ units along its major base, $m$ units along its orthogonal side and $(n-m+1)$ units along its minor base. It can be shown that the total number of units in the matrix equals $m(n-m-1/2)$.

In the following description, two subscripts are used to identify the position of any unit in the matrix, the first subscript denoting the column $(1, 2, \ldots n)$ and the second subscript indicating the row $(a, b, \ldots m)$. The first row contains $n$ units $F_{1a}, G_{2a} - G_{(m-1)a}, Q_{na}$; the second row has $(n-1)$ units $G_{2b}, H_{3b} - H_{(n-1)b}, R_{nb}$, the number of units per row decreasing progressively to the last row consisting of $(m-n+1)$ units $S_{mm} - S_{(n-1)m}, R_{nm}$. The units are, accordingly, of six different types, namely a type "F" represented by the single unit $F_{1a}$ at upper left, a type "G" disposed in the upper row and along the diagonal between units $F_{1a}$ and $S_{nm}$, a type "H" accounting for all the internal units of the matrix, a type "Q" represented by the single unit $Q_{na}$ at upper right, a type "R" occupying the remainder of the last column, and a type "S" making up the last row except for corner unit $R_{nm}$.

Figure 3:
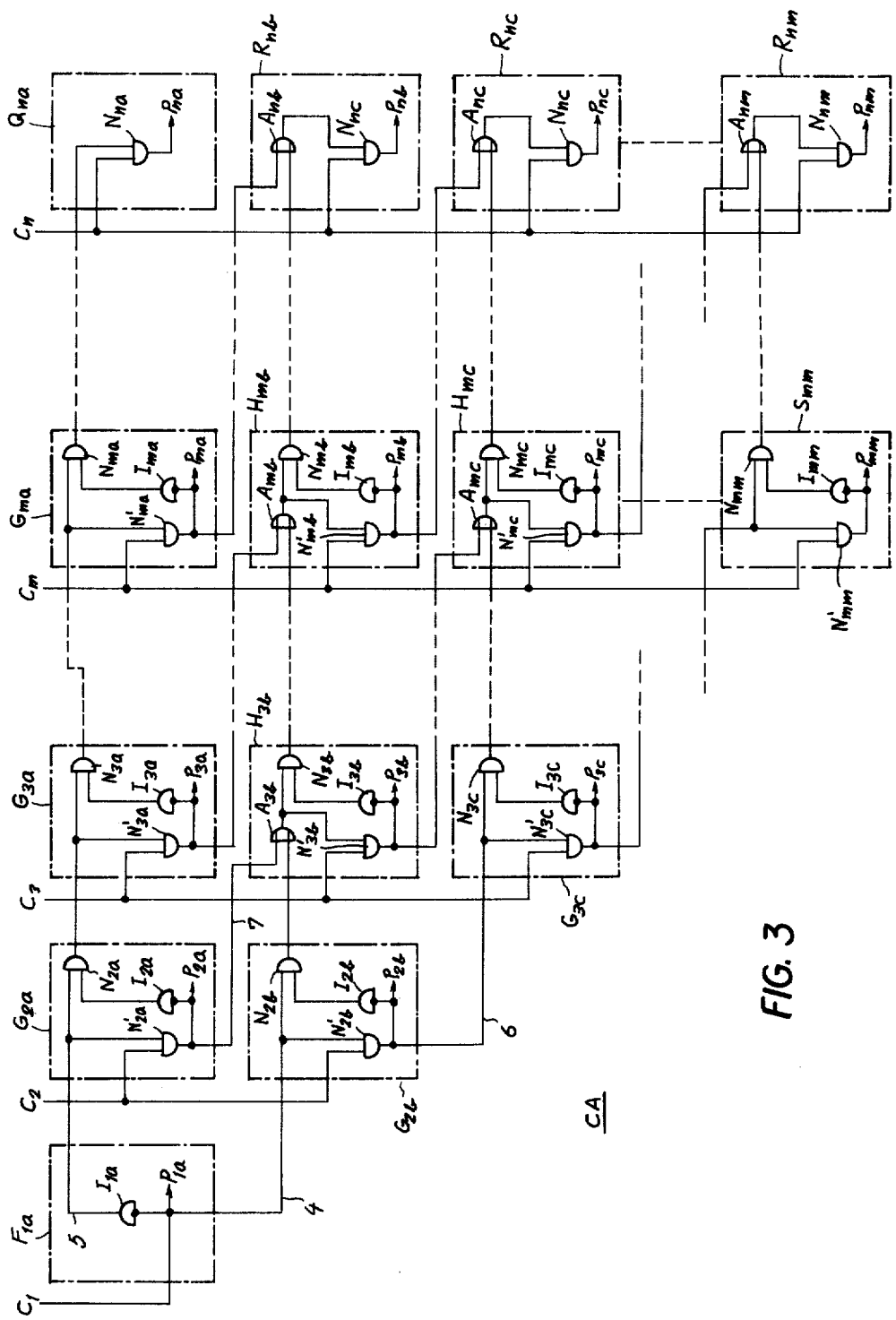
FIG. 3 is a more detailed circuit diagram of the matrix shown in FIG. 2.

As shown in FIG. 3, type "H" is the most complete unit from which all the others are derived by omission of one or more components; in practice, the unutilized components may be deactivated by short- or open-circuiting. These components, which in FIG. 3 are given the same subscripts as the units to which they pertain, are an inverter I, an OR gate A and a pair of AND gates N, N'. Type "F" utilizes only the inverter, designated $I_{1a}$ in unit $F_{1a}$. Type "Q" employs only one AND gate, i.e. gate $N_{na}$ in unit $Q_{na}$. In type "G" the OR gate A has been omitted. Type "S" differs from type "G" by the absence of a branch lead from the output of AND gate N'. Type "R", finally, encompasses only the OR gate A and the AND gate N.

Control input $c_1$ is connected to an output lead $P_{1a}$ of unit $F_{1a}$ and, in parallel therewith, to an input lead 4 of gates $N_{2b}$ and $N'_{2b}$ of the diagonally adjoining unit $G_{2b}$ and via inverter $I_{1a}$ to an input lead 5 of gates $N_{2a}$ and $N'_{2a}$ of unit $G_{2a}$. Gate $N'_{2a}$ works into the output lead $P_{2a}$ of unit $G_{2a}$ and in parallel therewith into an input lead 7 of OR gate $A_{3b}$ of the diagonally adjoining unit $H_{3b}$ feeding the AND gates $N_{3b}$ and $N'_{3b}$ thereof; the other input of OR gate $A_{3b}$ is tied to the output of AND gate $N_{2b}$ in the immediately preceding unit $G_{2b}$ of the same row. The second input of gate $N_{2b}$ is connected to output lead $P_{2b}$ of unit $G_{2b}$ through its inverter $I_{2b}$, that output lead being tied to a lead 6 extending from gate $N'_{2b}$ to inputs of AND gates $N_{3c}$ and $N'_{3c}$ in the diagonally adjoining unit $G_{3c}$. Analogous connections extend between the other units of the matrix whose output leads P are distinguished from one another by corresponding subscripts. Each control input $c_1 - c_n$ is connected in parallel to all the units of a respective column.

It will be apparent that the value of $n$ could be increased without changing $m$ by adding a unit in each row; the value of $m$ can be increased without changing $n$ by extending the sloping side of the trapezoid downwardly, i.e. by adding one or more units "R" to the last column and "S" to adjoining columns. In the limiting case of $m = n$, the trapezoid becomes a right triangle.

Figure 4:
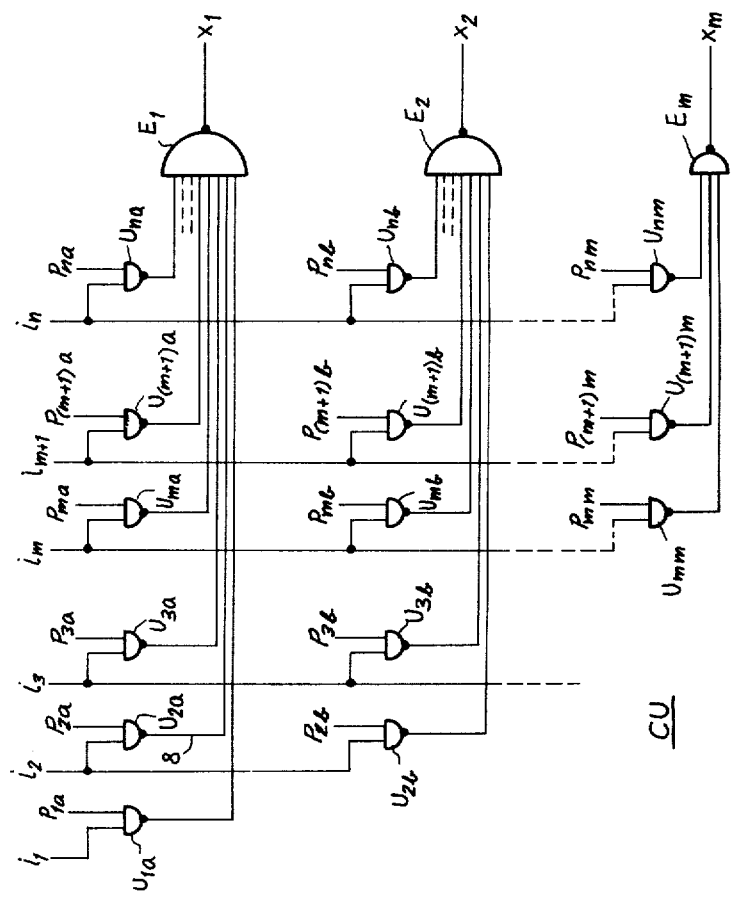
FIG. 4 is a similar circuit diagram of a performing matrix forming part of the concentrator of FIG. 1.

Reference will now be made to FIG. 4 showing one mode of realization of the performing section CU. This matrix will be seen to comprise an array of secondary gating circuits $U_{1a} - U_{nm}$ having the same trapezoidal configuration as matrix CA in FIG. 3, with a first row of $n$ modular units $U_{1a} - U_{na}$ defining the major base of the trapezoid, a last row of $(n-m+1)$ units $U_{mm} - U_{nm}$ defining its minor base, and an orthogonal side formed by the last column consisting of $m$ units $U_{na} - U_{nm}$, the number of units per column again increasing progressively from 1 in the first column through $m$ in the $m^{th}$ column.

Each of the units of the matrix shown in FIG. 4 consists of a simple NAND gate with two inputs respectively connected to a data input $i_1 - i_n$ and a switching lead $P_{1a} - P_{nm}$ of the corresponding primary unit (FIGS. 2 and 3) individually associated therewith. The first data input $i_1$ is connected only to gate $U_{1a}$ constituting the first column of the matrix; data input $i_2$ is connected to gates $U_{2a}$ and $U_{2b}$ of the second column, and so forth, each data input being connected in parallel to all the units of a respective column of section CU in a manner analogous to the connection of the corresponding control inputs $c_1 - c_n$ of the units of section CA in FIG. 3.

Concentrator section CU further comprises $m$ multiple-input NAND gates $E_1, E_2, \ldots E_m$, one for each row of gating circuits, the outputs of the two-input constituent NAND gates of a row being all connected to respective inputs of the associated multi-input NAND gate forming part of a summing circuit. Thus, NAND gates $U_{1a} - U_{na}$ all have true outputs in the de-energized states of their inputs $i_1 - i_n$ and $P_{1a} - P_{na}$ so that the summing NAND gate $E_1$ is cut off and its data output $x_1$ is not energized; in the same way, NAND gates $E_2 - E_m$ will have zero outputs on leads $x_2 - x_m$ in the quiescent condition. If, however, any of the constituent NAND gates of a row is cut off, the corresponding summing NAND gate conducts and energizes the respective data output $x_1 - x_m$.

Figure 5:
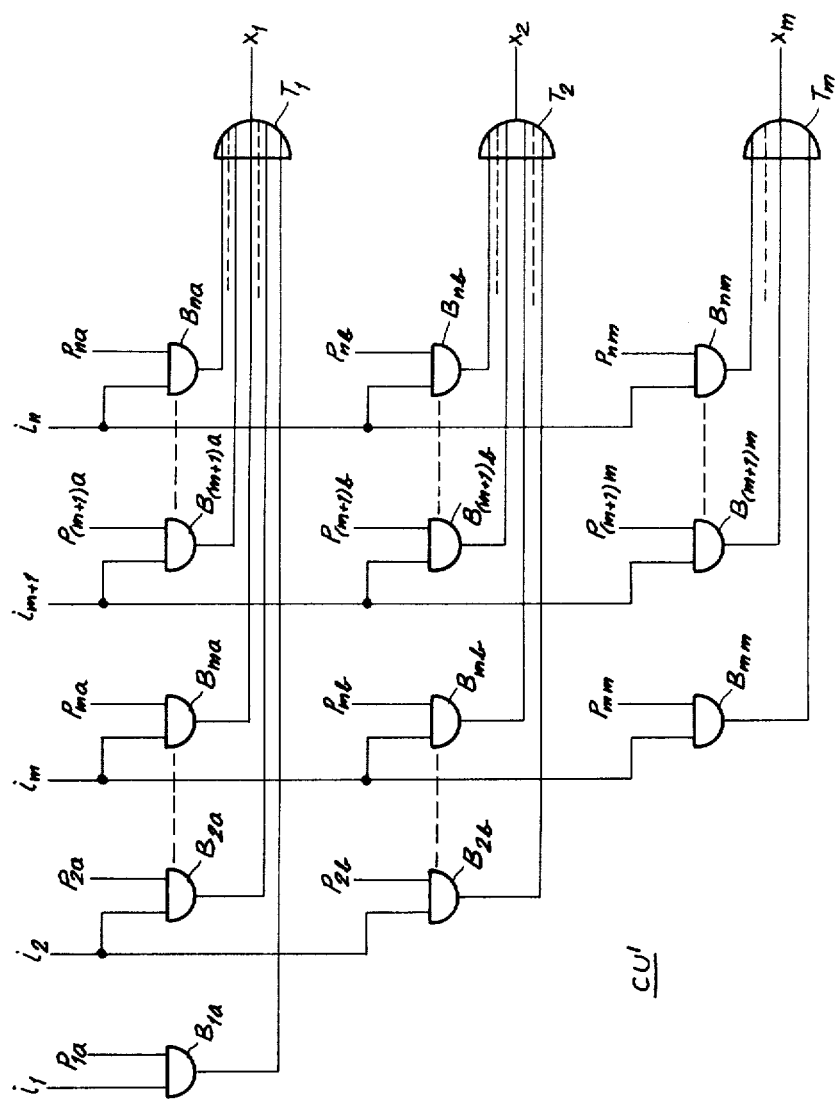
FIG. 5 is a diagram like that of FIG. 4, showing a modified performing matrix.

The modified concentrator section CU' shown in FIG. 5 is the equivalent of section CU shown in FIG. 4 and comprises an identical array of gating circuits and summing circuits, the former consisting of AND gates $B_{1a} - B_{nm}$ whereas the latter comprise OR gates $T_1 - T_m$ working into respective data outputs $x_1 - x_m$. Again, simultaneous energization of a data input and an internal activating or switching input of any constituent gate of a row produces a true output at the corresponding summing gate.

Operation

From FIG. 3 it will be apparent that the voltage on control input $c_1$ directly energizes the output lead $P_{1a}$ of unit $F_{1a}$ to apply an activation or switching signal to the associated gate $U_{1a}$ or $B_{1a}$ in FIGS. 4 or 5. The presence of such a signal on lead 4 also makes the diagonally adjoining unit $G_{2b}$ activable by opening its gate $N'_{2b}$ so that output lead $P_{2b}$ can be energized by a true signal on control input $c_2$, with transmission of an activation signal to the associated secondary gating unit $U_{2b}$ or $B_{2b}$. Through inverter $I_{1a}$, lead 5 is de-energized by the activation signal on lead $P_{1a}$ so that AND gates $N_{2a}$ and $N'_{2a}$ of unit $G_{2a}$ are blocked, this unit being therefore no longer switchable as it is in the absence of a signal on control input $c_1$. With the normally conducting gate $N_{2a}$ cut off, the corresponding gate $N_{3a}$ of the next unit $G_{3a}$ of the first row is also cut off, and so on down the line through terminal unit $Q_{na}$. In an analogous manner, an activation signal on lead $P_{2b}$ of unit $G_{2b}$ cuts off the gate $N_{2b}$ thereof by way of inverter $I_{2b}$ so that, with lead 7 already de-energized by the aforedescribed blocking of gate $N'_{2a}$ in unit $G_{2a}$, OR gate $A_{3b}$ in unit $H_{3b}$ no longer conducts and the corresponding AND gates $N_{3b}$ and $N'_{3b}$ are cut off, thus blocking that unit. Again, the following units of the second row are blocked in a corresponding manner but the next diagonally adjoining unit $G_{3c}$ is now switchable by virtue of the energization of lead 6. If, therefore, a control signal of logical value "1" appears on input $c_3$, unit $G_{3c}$ will emit the next activation signal, blocking all other units of the third row and enabling the diagonally adjoining unit of the fourth row.

If control input $c_1$ is not energized but input $c_2$ is the first one in the series to carry voltage, an activation signal appears on the output lead $P_{2a}$ of unit $G_{2a}$ and, via lead 7 and OR gate $A_{3b}$, renders switchable the diagonally adjoining unit $H_{3b}$ of the second row while blocking all the following units of the first row via inverter $I_{2a}$.

If control signals are present on inputs $c_1$ and $c_3$ but not on the intervening input $c_2$, the energization of lead 4 and the absence of a signal on lead $P_{2b}$ makes the AND gate $N_{2b}$ conductive so that the second unit $H_{3b}$ of the second row is enabled to respond to a control signal on input $c_3$ to generate an activation or switching signal on output $P_{3b}$.

It will be clear from these examples that the first control input to be energized, in the series of inputs $c_1 - c_n$, will result in the emission of an activation signal from one of the units of the first row; the second control input so energized will call forth an activation signal from a unit of the second row, and so on up to a mazimum of $m$ energized control inputs. It will also be noted that not more than one activation signal can emanate from a given column.

The performing matrix of FIGS. 4 or 5 thus receives up to $m$ activation signals in as many different rows and columns. If a corresponding data input is also energized, voltage will appear in the output of the summing gate of that row. Thus, for example, a logical "0" on control input $c_1$ (FIG. 3) and a logical "1" on control input $c_2$ will give rise to an activation signal on lead $P_{2a}$ which, in the presence of a logical "1" on data input $i_2$, cuts off the NAND gate $U_{2a}$ in FIG. 4 to de-energize its output lead 8 whereby summing gate $E_1$ conducts and produces a logical "1" on data output $x_1$. In an equivalent manner, AND gate $B_{2a}$ in FIG. 5 would become conductive and energize the same data output $x_1$ through OR gate $T_1$.

We claim:

1. A programmable data concentrator, comprising:
 a logic network with $n$ data inputs, $n$ control inputs and $m$ data outputs, $m$ being smaller than $n$; and
 circuitry for selectively energizing said control inputs in different combinations for transmitting binary signals from up to $m$ data inputs to as many data outputs;
 said network being divided into an enabling section provided with said control inputs and a performing section provided with said data inputs and outputs, said enabling section including a multiplicity of primary gating circuits, said performing section including a like multiplicity of secondary gating circuits individually associated with respective primary gating circuits of said enabling section for receiving activating signals therefrom upon the energization of correspondong control inputs, said primary gating circuits being interconnected in $m$ preference chains permitting the emission of not more than one activating signal per chain, said performing section being provided with $m$ summing circuits each connecting one of said data outputs to a number of secondary gating circuits associated with the primary gating circuits of a respective chain.

2. A data concentrator as defined in claim 1 wherein the number of gating circuits per section is $m(n-m-1/2)$.

3. A data concentrator as defined in claim 2 wherein the gating circuits of each section form a truncated orthogonal matrix with $n$ columns and $m$ rows, the number of gating circuits per row decreasing progressively from $n$ in the first row to $(n-m+1)$ in the last row, the rows of said enabling section constituting said preference chains, the rows of said performing section being each provided with one of said summing circuits.

4. A data concentrator as defined in claim 3 wherein the number of gating circuits per column of each matrix increases progressively from 1 in the first column to $m$ in the $m^{th}$ column and equals $m$ in any subsequent column, each control input being connected in parallel to all the primary gating circuits of a respective column, each data input being connected in parallel to all the secondary gating circuits of a respective column.

5. A data concentrator as defined in claim 4 wherein only the primary gating circuits of the first row are directly activable by energization of their respective control inputs, each except the last primary gating circuit of any but the last row having a noninverting connection to the immediately following gating circuit of the next row for making same activable upon emission of an activation signal, each except the last primary gating circuit of any row having an inverting connection to all following gating circuits of the same row for blocking same upon emission of an activation signal.

6. A data concentrator as defined in claim 4 wherein each of said secondary gating circuits comprises a coincidence gate connected on the one hand to the respective gate input and on the other hand to the associated primary gating circuit for receiving the activation signal thereof.

7. A data concentrator as defined in claim 6 wherein said coincidence gates are two-input NAND gates, said summing circuits including each a multi-input NAND gate connected to the outputs of all the two-input NAND gate of the respective row.

8. A data concentrator as defined in claim 6 wherein said coincidence gates are AND gates, said summing circuits including each an OR gate with inputs connected to the outputs of all the AND gates of the respective row.

9. A data concentrator as defined in claim 1 wherein said circuitry comprises a binary memory with a plurality of stages of $n$ cells each and address means for reading out the contents of respective cells of a selected stage into said control inputs.

10. A data concentrator as defined in claim 1 wherein all said primary gating circuits are constituted by basically identical modular units.

* * * * *